US009132751B2

(12) United States Patent
Ficyk et al.

(10) Patent No.: US 9,132,751 B2
(45) Date of Patent: Sep. 15, 2015

(54) REMOTE DAMPING SYSTEM

(75) Inventors: Eugene John Ficyk, Livonia, MI (US); Derek Scott Hrabovsky, Romeo, MI (US)

(73) Assignee: LEGGETT & PLATT CANADA CO., Halifax, Nova Scotia (CA)

( * ) Notice: Subject to any disclaimer, the term of this patent is extended or adjusted under 35 U.S.C. 154(b) by 0 days.

(21) Appl. No.: 13/559,344

(22) Filed: Jul. 26, 2012

(65) Prior Publication Data

US 2014/0028065 A1    Jan. 30, 2014

(51) Int. Cl.
| | |
|---|---|
| *B60N 2/20* | (2006.01) |
| *B60N 2/48* | (2006.01) |
| *B60N 2/16* | (2006.01) |
| *B60N 2/22* | (2006.01) |
| *B60N 2/44* | (2006.01) |

(52) U.S. Cl.
CPC ............... *B60N 2/20* (2013.01); *B60N 2/1675* (2013.01); *B60N 2/2227* (2013.01); *B60N 2/444* (2013.01); *B60N 2/4858* (2013.01)

(58) Field of Classification Search
CPC .... B60N 2/4858; B60N 2/1675; B60N 2/444; B60N 2/2227; B60N 2/20
USPC ........... 188/299.1, 290, 266.3, 291, 293, 294; 297/216.12, 216.13, 216.1
See application file for complete search history.

(56) References Cited

U.S. PATENT DOCUMENTS

| | | | |
|---|---|---|---|
| 3,951,429 A * | 4/1976 | Satzinger ...................... 280/727 |
| 4,826,094 A | 5/1989 | Whiteley | |
| 4,881,423 A | 11/1989 | Troiano | |
| 5,257,646 A | 11/1993 | Meyer | |
| 5,449,054 A | 9/1995 | Wiese et al. | |
| 5,497,863 A | 3/1996 | Schmidt et al. | |
| 5,605,208 A | 2/1997 | Friedrichsen et al. | |
| 6,095,922 A | 8/2000 | Friedrichsen et al. | |
| 6,142,269 A | 11/2000 | Wonn | |
| 6,173,822 B1 | 1/2001 | Korb et al. | |
| 6,422,632 B1 * | 7/2002 | Kamei et al. ................. 296/68.1 |
| 6,585,318 B1 * | 7/2003 | Tak ........................... 297/216.13 |

(Continued)

FOREIGN PATENT DOCUMENTS

| | | |
|---|---|---|
| DE | 4021321 A1 | 10/1991 |
| DE | 19940813 | 3/2001 |

(Continued)

OTHER PUBLICATIONS

International Search Report and Written Opinion of the International Searching Authority, International Patent Application No. PCT/CA2013/000649, mailed Nov. 5, 2013 (8 pages).

(Continued)

*Primary Examiner* — Thomas J Williams
*Assistant Examiner* — Mariano Sy
(74) *Attorney, Agent, or Firm* — Michael Best & Friedrich LLP

(57) ABSTRACT

An adjustable vehicle seat includes a seat track, a seat base, a backrest, and a remote damping system. The remote damping system includes a housing and a damping element disposed within the housing. A traction cable has a sheath with a first end and a second end, and a wire with a first end and a second end. The first end of the sheath is fixed with respect to the housing and the first end of the cable is coupled to the damping element.

12 Claims, 10 Drawing Sheets

(56) References Cited

U.S. PATENT DOCUMENTS

| | | | |
|---|---|---|---|
| 6,601,915 B2* | 8/2003 | Sullivan et al. | 297/216.1 |
| 6,857,675 B2* | 2/2005 | Kurachi et al. | 296/37.12 |
| 7,604,293 B2* | 10/2009 | Matsuhashi | 297/216.2 |
| 2009/0322126 A1* | 12/2009 | Nishiura et al. | 297/216.12 |
| 2010/0164262 A1* | 7/2010 | Okimura et al. | 297/216.12 |
| 2012/0056460 A1* | 3/2012 | Baker | 297/331 |

FOREIGN PATENT DOCUMENTS

| | | | |
|---|---|---|---|
| JP | 11262426 A | * | 9/1999 |
| JP | 2009101762 A | * | 5/2009 |
| JP | 2010149713 A | * | 7/2010 |
| WO | 2010/116415 A1 | | 10/2010 |

OTHER PUBLICATIONS

The dampers as shown and described at http://www.itwmotion.com/products-large-std-dampers.php, which were sold and accessible to the public at least prior to Jul. 26, 2011, 14 pages.

* cited by examiner

US 9,132,751 B2

REMOTE DAMPING SYSTEM

BACKGROUND

The present invention relates to a damping system for remote use with a seat, specifically with a vehicle seat.

SUMMARY

Dampers can be used with vehicle seats to slow down the speed at which certain components, such as headrests or backrests, respond when acted on by a force. Locating a damper directly at the point of motion, such as at a pivot point, however, is often difficult due to space constraints and other considerations.

In one embodiment of a remote damping system for damping the relative motion of a first component with respect to a fixed second component, the system includes a housing coupled to the first component, a damping element disposed within the housing, and a flexible wire with a first end and a second end. The first end of the wire is coupled to the damping element and the second end of the wire is coupled to the second component.

In another embodiment of a remote damping system for damping the relative motion of a first component with respect to a fixed second component, the system includes a housing coupled to the second component, a damping element disposed within the housing, and a flexible wire with a first end and a second end. The first end of the wire is coupled to the damping element and the second end of the wire is coupled to the first component.

In one embodiment of an adjustable vehicle seat, the seat includes a seat track, a seat base, a backrest, and a remote damping system. The remote damping system includes a housing and a damping element disposed within the housing. A fraction cable has a sheath with a first end and a second end, and a wire with a first end and a second end. The first end of the sheath is fixed with respect to the housing and the first end of the cable is coupled to the damping element.

In one embodiment of a remote damping device for use with a flexible wire, the wire has a first end and a second end. The remote damping device includes a housing and a rotary damping element disposed within the housing and having an axis of rotation. A shaft is coupled to the rotary damping element and substantially aligned along the axis of rotation. A spool is coupled to the shaft and the first end of the wire is configured to be coupled to the spool.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

Figure 1:
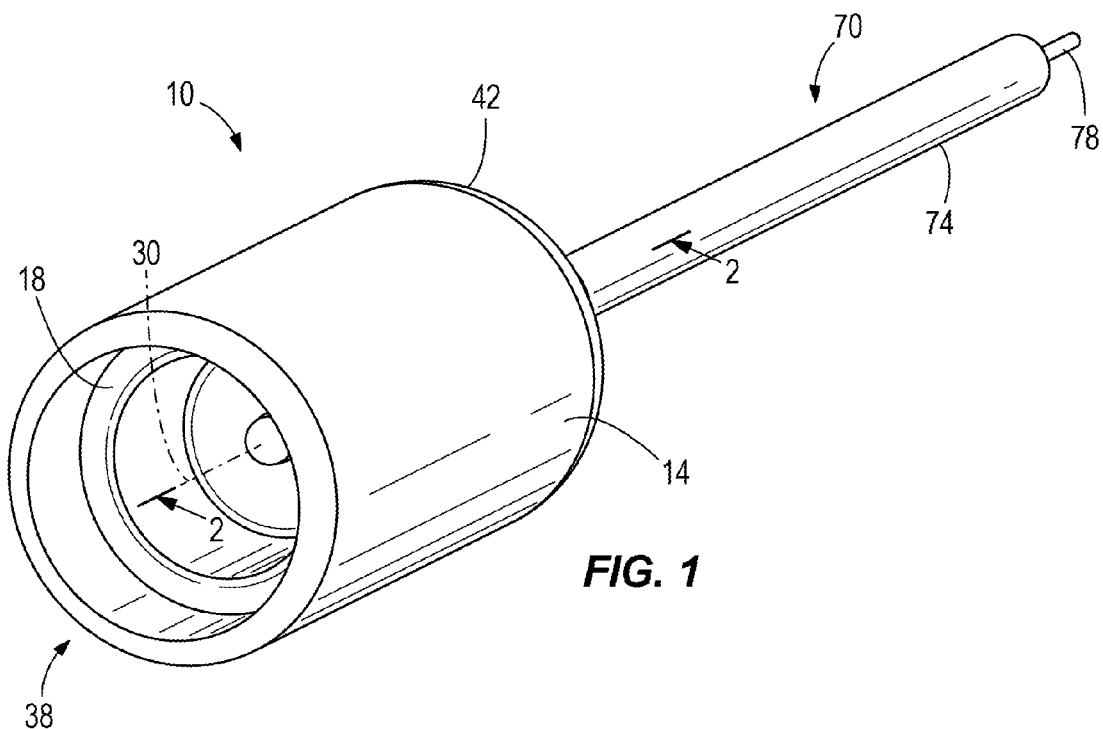
FIG. 1 is a perspective view of a linear damper for remote use.
Figure 2:
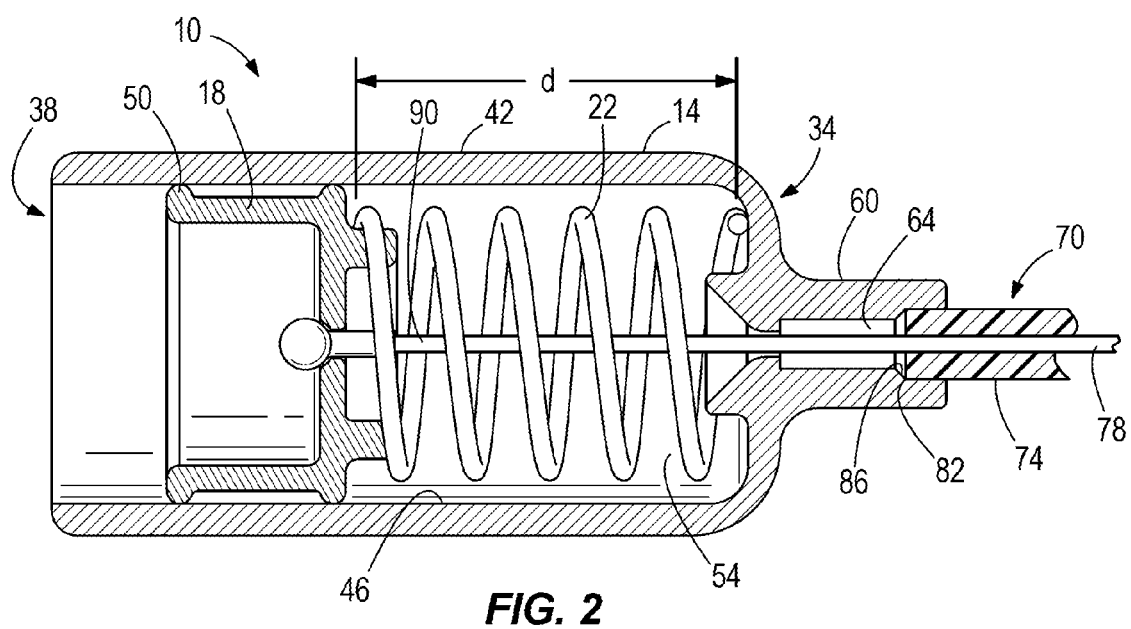
FIG. 2 is section view taken along line 2-2 of FIG. 1.

FIGS. 1 and 2 illustrate a linear damper 10. The damper 10 includes a housing 14 containing a damping element 18 and a spring 22. The housing 14 is generally cylindrical in shape with a circular cross section centered about an axis 30, though the housing shape need not be so limited, and could be, for example, rectangular with an accompanying rectangular cross section. The housing 14 has a generally closed first end 34 and a second end 38 at least partially open to the atmosphere, and comprises a wall 42 defining an inside surface 46. The damping element 18 is substantially symmetric about the axis 30 and includes a perimeter 50 abutting the inside surface 46 uniformly or, alternatively, at one or more discrete points. The damping element 18 and the inside surface 46 further define the damper interior 54. The damping element 18 includes one or more apertures (not shown) providing fluid communication from the interior 54 to atmosphere. The apertures can vary in size and location, as is known to those of ordinary skill in the art, and can include any openings between the perimeter 50 and the inside surface 46, or openings within the body of the element 18 itself. The spring 22, which can be in the form of a linear spring, spans the variable axial distance d defined by the interior 54 and abuts the damping element 18 and the first end 34, respectively.

A protrusion 60 extends axially from the closed first end 34 and forms a recess 64. A traction cable 70 comprises a sheath 74 and a flexible wire 78 and extends from the damper 10 to a point remote from the damper 10. The sheath 74 includes a first end 82 and a second end (not shown). The sheath 74 is coupled to the protrusion 60 and the first end 82 is positioned partially within the recess 64, abutting a shoulder 86 that assists in inhibiting further movement of the sheath 74 toward the first end 34. A first end 90 of the wire 78 passes through the recess 64 and is coupled to the damping element 18 for movement therewith. The wire 78 is slidable within the sheath 74, as will be detailed below.

In operation, tension on the wire 78 from a remote object secured to the second end (not shown) of the wire 78 pulls the damping element 18 toward the closed end 34 against the force of the spring 22. The air within the interior 54 escapes through the aforementioned apertures to atmosphere, creating a damping effect transmitted through the wire 78 to slow the rate of travel of the remote object. When the tension on the wire 78 is released, the stored energy within the spring 22 returns the damping element 18 to a statically neutral position.

Figure 3A:
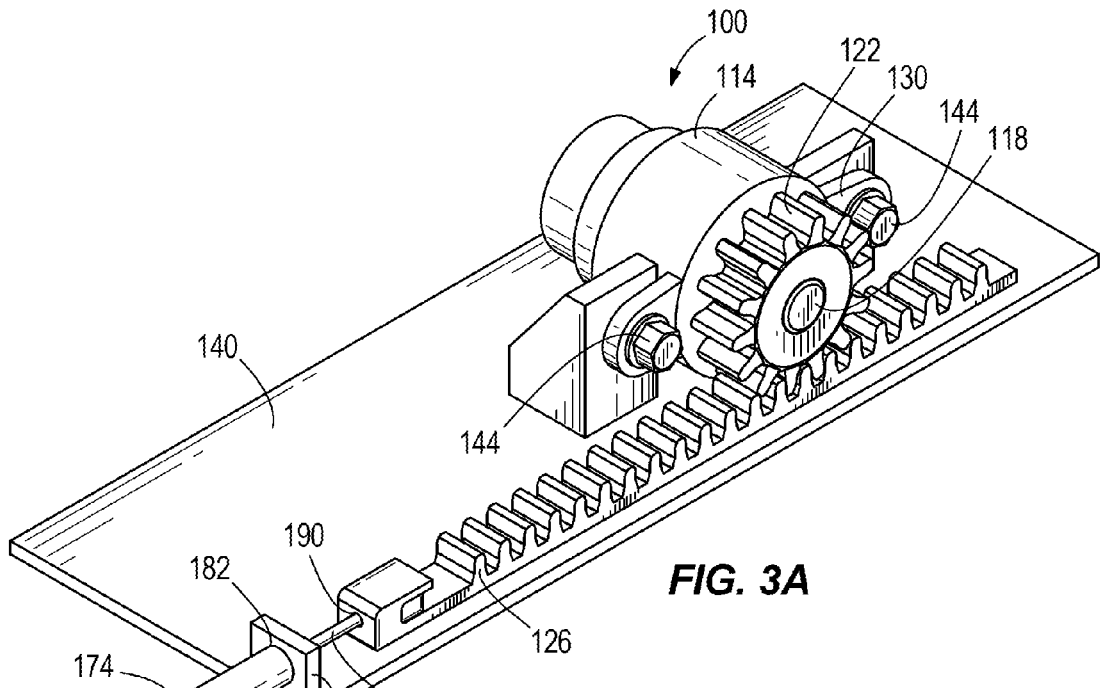
FIG. 3A is a perspective view of a rotary damper for remote use.

Referring to FIG. 3A, a rotary damper 100 includes a housing 114 containing a rotary damping mechanism (not shown), a shaft 118 mechanically coupled to the rotary damping mechanism, a gear 122 mounted to the shaft 118, and a toothed rack 126. Such a rotary damper 100 is known and commercially available from Illinois Tool Works. Extending from, or formed as part of, the housing 114 may be one or more projections 130 for securing the damper 100 to various objects. Specifically, the rotary damper 100 in application is secured to a rigid structure within a seat. For example, the rotary damper 100 can be secured to a mounting surface 140 within the seat using fasteners 144. The mounting surface 140 can be a portion of the seat frame.

A traction cable 170 includes a sheath 174 with a first end 182 and a second end (not shown). The first end 182 as illustrated is coupled to a stop 186, which can, but need not, comprise a portion of the mounting surface 140, and is fixed with respect to the housing 114. Surrounded by the sheath 174 is a wire 178 extending from a first end 190 to a point remote from the damper. Specifically, the first end 190 of the wire 178 is coupled to an end of the rack 126 for movement therewith.

Figure 3B:
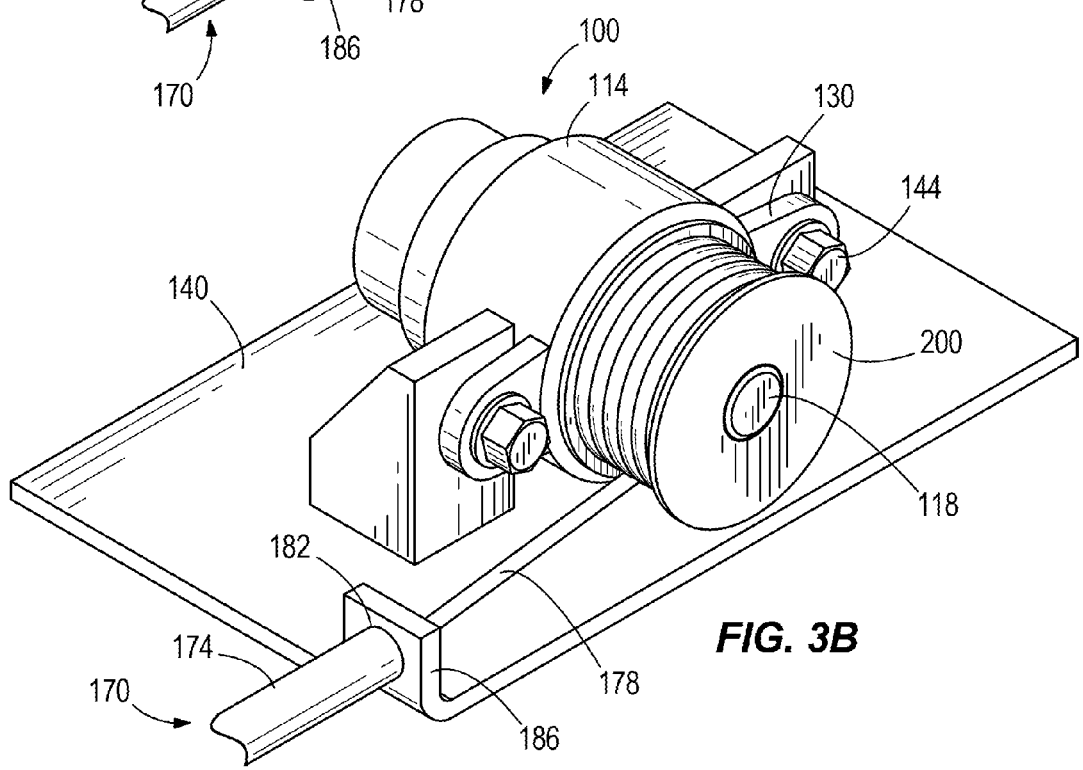
FIG. 3B is a perspective view of another rotary damper for remote use.

In an alternative embodiment of a rotary damper shown in FIG. 3B, the damper 100, substantially as previously described, includes a spool 200 on the shaft 118 in place of a gear. The wire 178 of the cable 170, to include the first end 190, wraps around the spool 200 and is taken up or released from the spool 200 during operation. Such an arrangement obviates the need for an additional component such as the rack 126 shown in FIG. 3A.

Referring to FIG. 3A, in operation, tension on the wire 178 from a remote object secured to the second end of the wire pulls the rack 126 of FIG. 3A toward the stop 186. Movement of the rack 126 rotates the gear 122, which turns the shaft 118. Referring to FIG. 3B, tension on the wire 178 from a remote object rotates the spool 200, which turns the shaft 118. With either damper 100 of FIGS. 3A, 3B, rotation of the shaft 118 initiates the rotary damping mechanism against the initial movement of the wire 178.

Figures 4, 7:
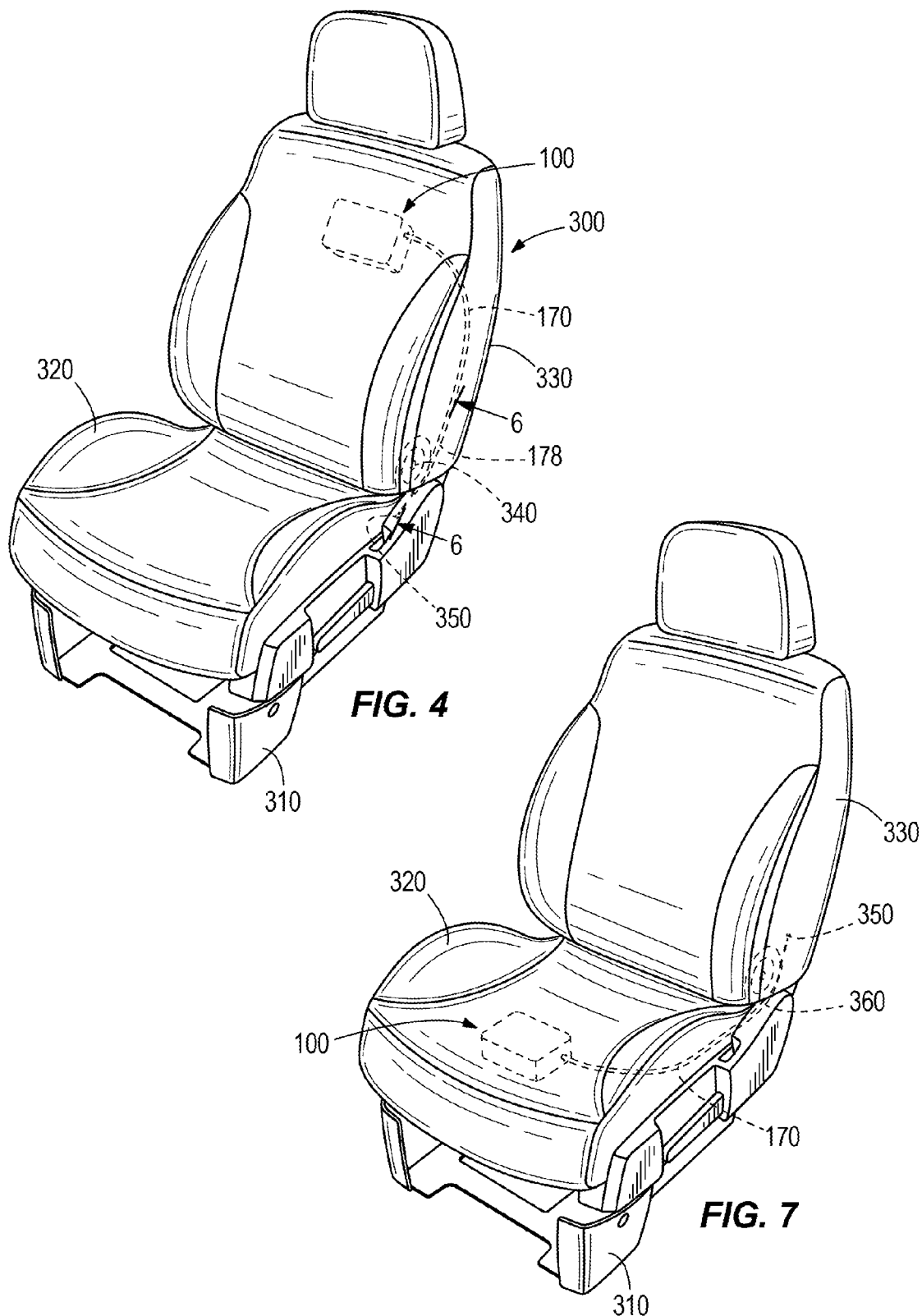
FIG. 4 is a perspective view of a vehicle seat including a remote damper for backrest damping.
FIG. 7 is a perspective view of a vehicle seat including another remote damper for backrest damping.
Figure 5:
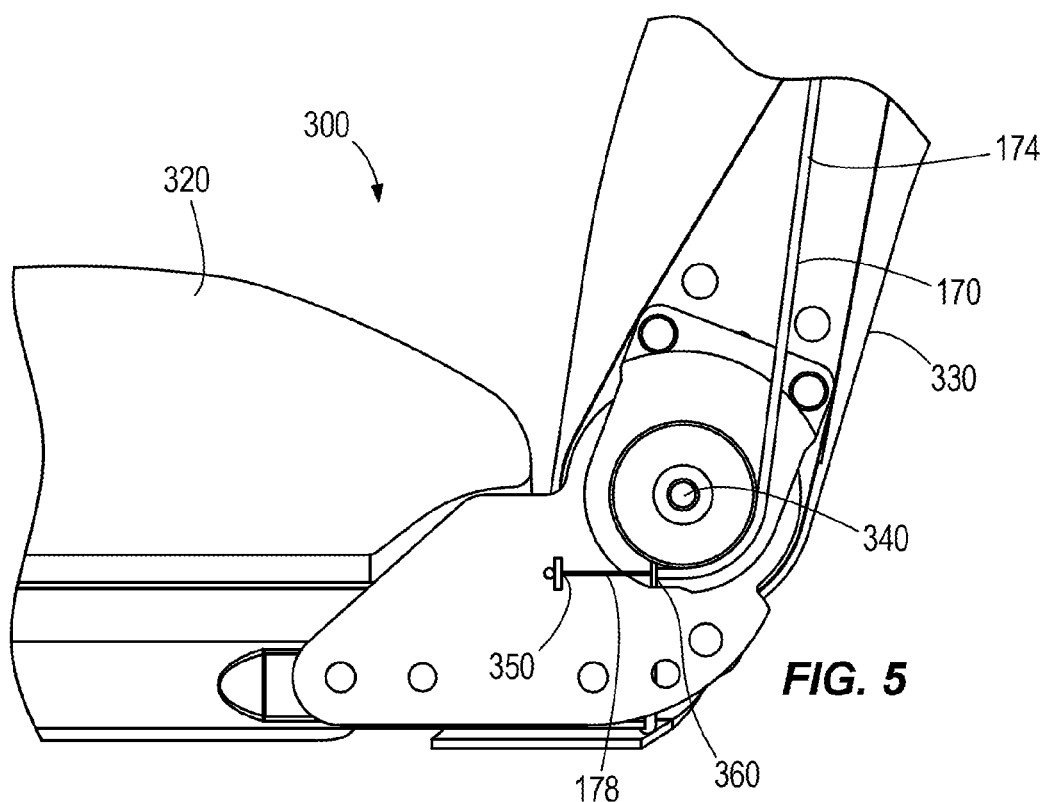
FIG. 5 is a section view taken along line 5-5 of FIG. 4 in a first position.

Referring to FIGS. 4 and 5, a seat 300 having a seat track 310, a seat base 320, and a seat backrest 330 includes a damper 100 as previously described. In this particular application, the damper 100 is positioned within the backrest 330 to damp motion of the backrest 330 forward about a pivot 340 and is secured to a fixed structural feature (not shown) within the backrest 330, such as a portion of the backrest frame. The precise location of the damper 100 within the backrest 330 is not pertinent to the operation of the damper 100. The second end 350 of the wire 178 is secured to a fixed point in the seat base 320 and the second end 360 of the sheath 174 is coupled to the pivot 340. The seat back 330 is illustrated in an upright position.

Figure 5A:
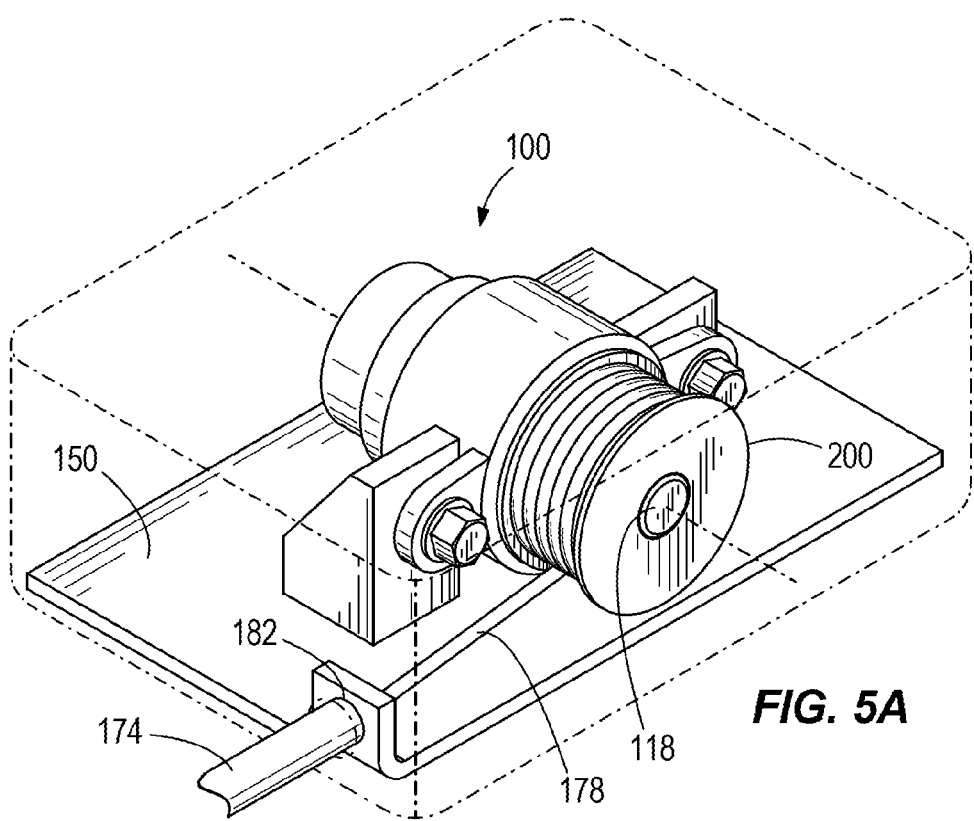
FIG. 5A is a perspective view of the remote damper of FIG. 4 in the first position.

Referring to FIG. 5A, the damper 100, illustrated here as a rotary damper with a spool 200, is located within the seat backrest 330 (see FIG. 4) and in a first position with a portion of wire 178 wrapped around the spool 200. As previously described, the illustrated mounting surface 140 is merely representative of structure within the backrest 330, i.e., specific backrest frame component(s), to which the damper 100 may be affixed.

Figure 6:
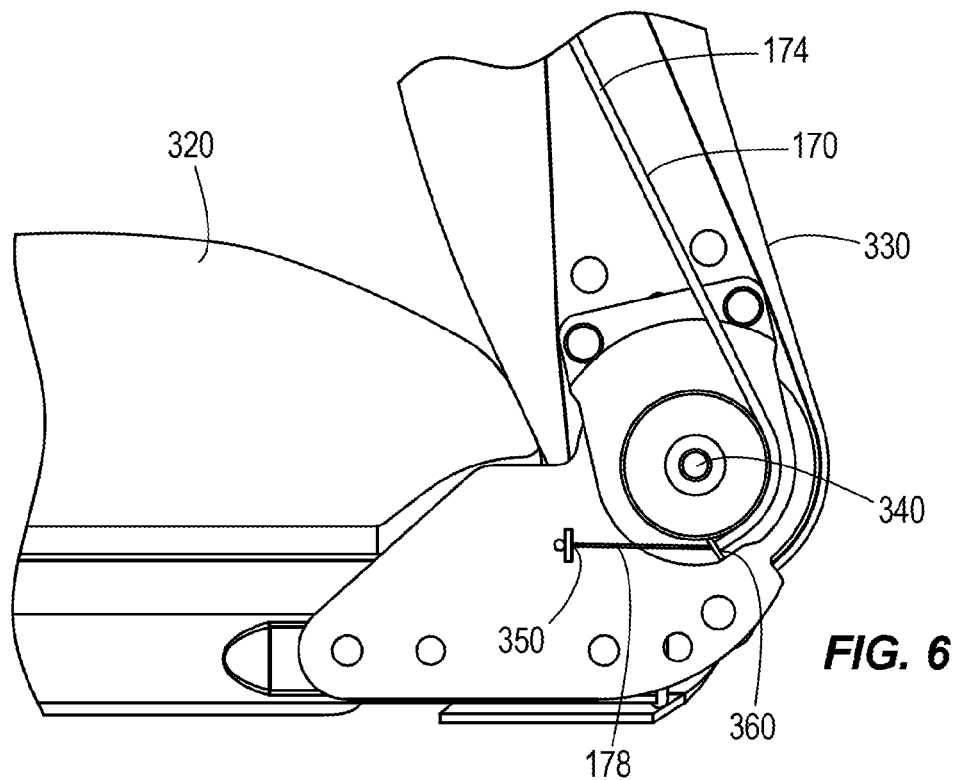
FIG. 6 is a section view taken along line 5-5 of FIG. 4 in a second position.
Figure 6A:
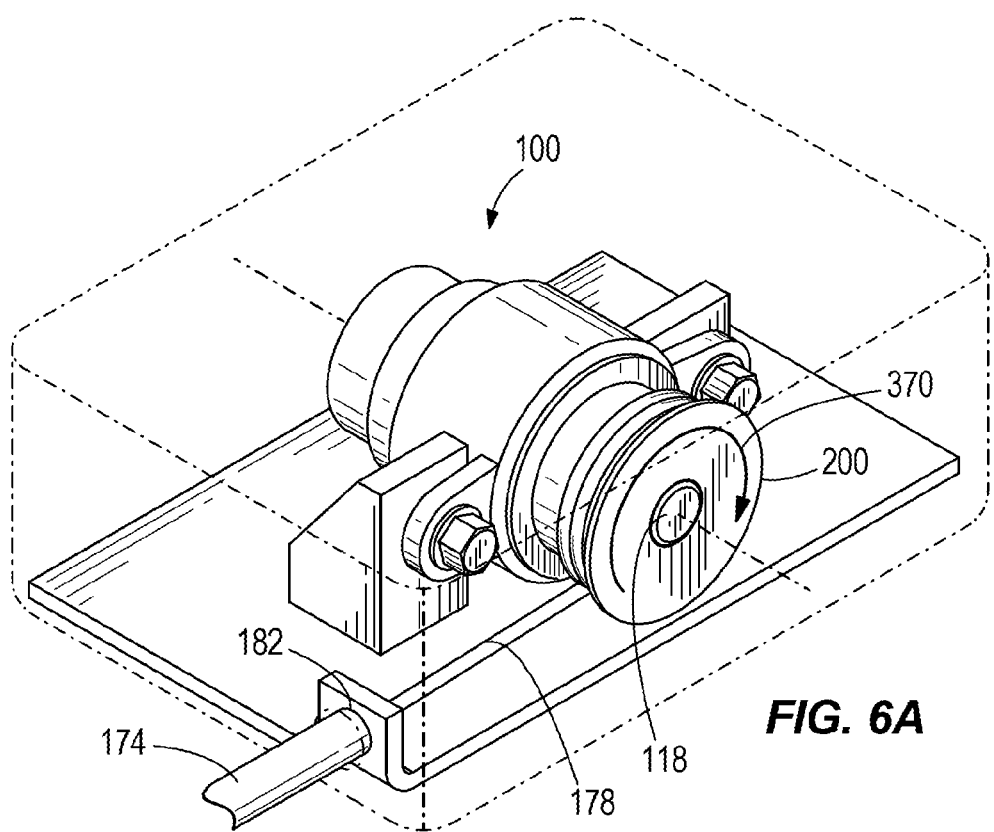
FIG. 6A is a perspective view of the remote damper of FIG. 4 in the second position.

Referring to FIGS. 6 and 6A, in operation the backrest 330 is positioned forward about the seat pivot 340 by a user. As shown, the second end 360 of the sheath 174, secured to the seat pivot 340, travels circumferentially with the seat pivot perimeter to permit the first end 182 of the sheath 174 to move with the damper 100. Because the second end 350 of the wire 178 remains static during folding of the backrest 330, wire is unwound from the spool 200 of the damper 100, as indicated by the rotational arrow 370 of FIG. 6A. This concurrent rotation of the spool 200 and the shaft 118 activates the damping response within the rotary damper 100, which acts through the wire 178 to suppress the speed of forward motion of the backrest 330. Changing the position of the second ends 350, 360 of the wire and sheath about the seat pivot 340 permits damping of rearward rotation of the backrest 330 relative to the seat base 320.

In an alternative position for damping the backrest motion, as shown in FIG. 7, the damper 100 is coupled to structure within the seat base 320, with the second end 360 of the sheath 174 also secured to structure within the seat base 320 and the second end 350 of the wire 178 secured to the pivot 340. In operation, as the backrest 330 is positioned forward about the seat pivot 340, the second end 350 of the wire 178 travels circumferentially with the seat pivot perimeter, tensioning the wire 178 and activating the rotary damper, as previously explained.

Figure 8:
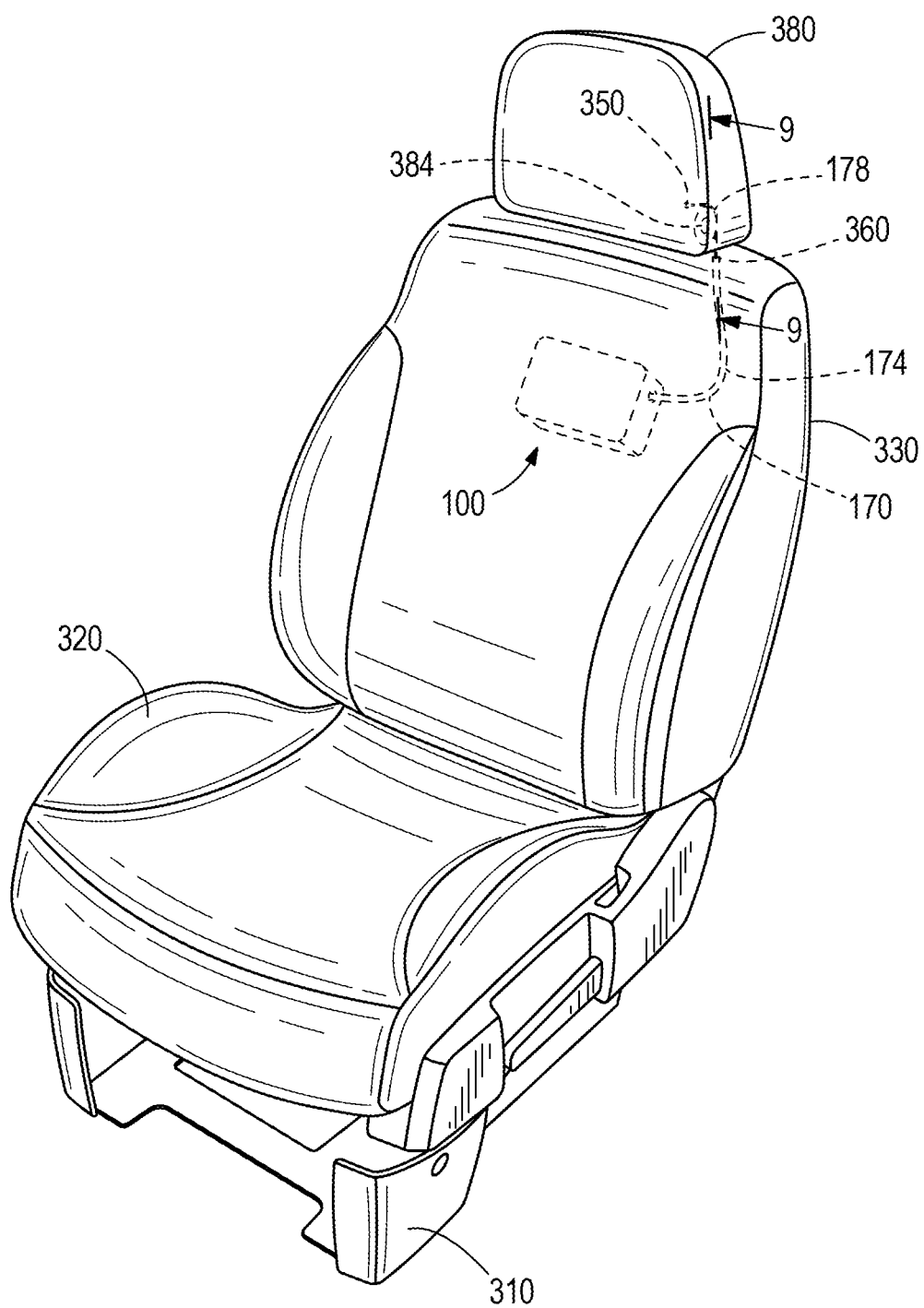
FIG. 8 is a perspective view of a vehicle seat including a remote damper for headrest damping.
Figure 9:
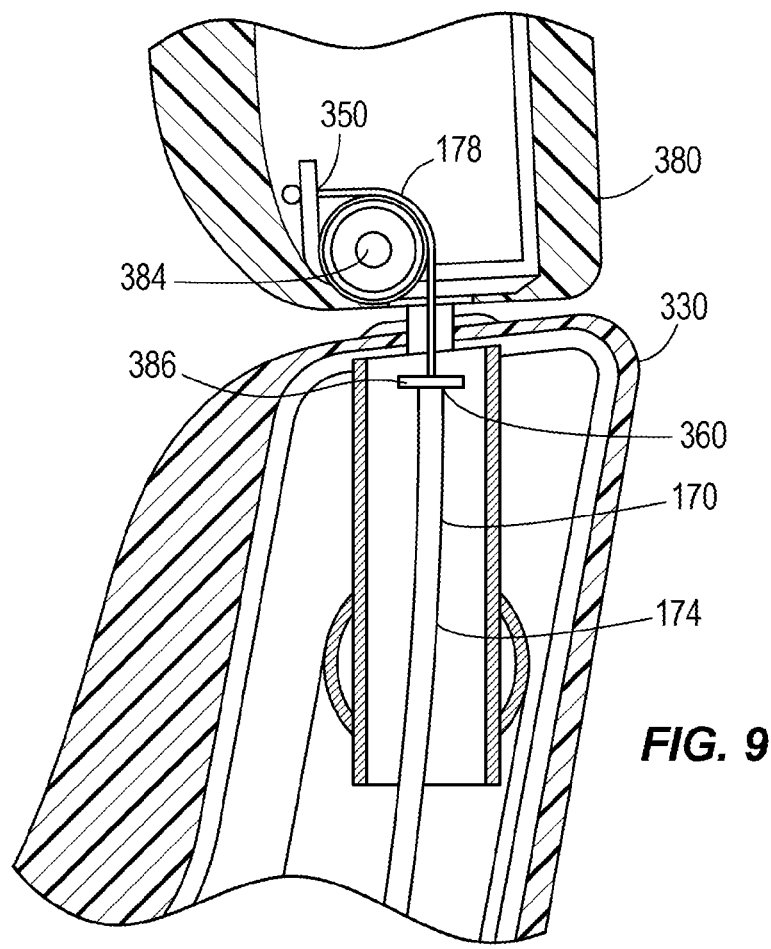
FIG. 9 is a section view taken along line 9-9 of FIG. 8 in a first position.
Figure 9A:
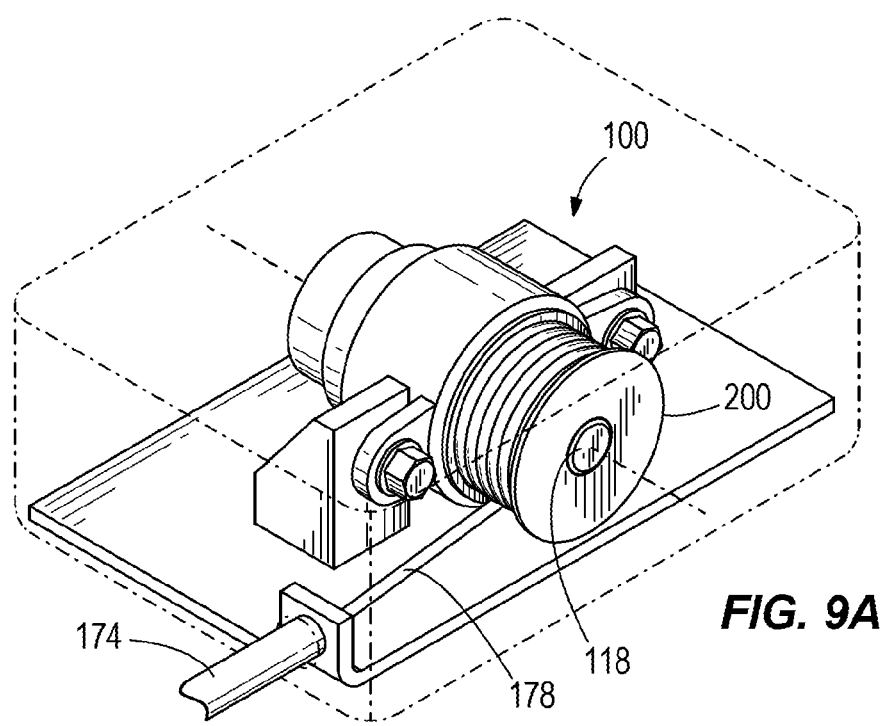
FIG. 9A is a perspective view of the remote damper of FIG. 8 in the first position.

Referring to FIGS. 8, 9, and 9A, another seat having a seat track 310, a seat base 320, and a seat backrest 330 includes a damper 100 positioned to damp motion of a headrest 380 forward about a headrest pivot 384. The damper 100 is secured to a fixed structural feature within the backrest 330, the precise location of which is again not pertinent to the operation of the damper 100. The second end 360 of the sheath 174 abuts or is secured to a fixed feature 386 within the backrest 330. The second end 350 of the wire 178 is secured to the pivot 384 or, alternatively, to a fixed point within the headrest 380. As shown in FIG. 9A, the damper 100, illustrated here as the rotary damper and located within the seat backrest 330 (see FIG. 8), is in a first position with a portion of wire 178 wrapped around the spool 200.

Figure 10:
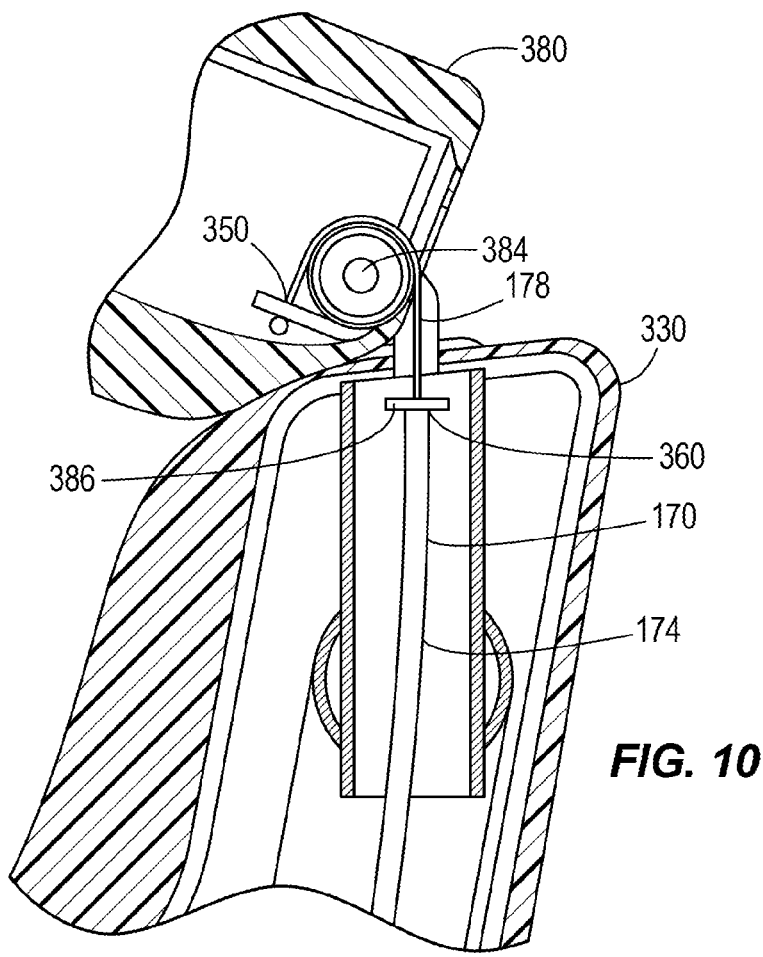
FIG. 10 is a section view taken along line 9-9 of FIG. 8 in a second position.
Figure 10A:
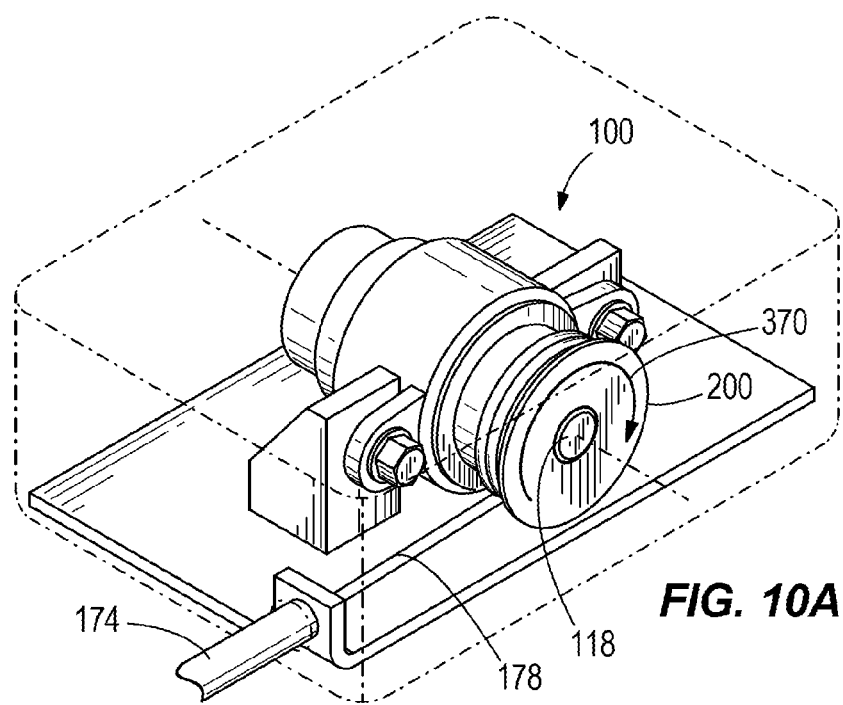
FIG. 10A is a perspective view of the remote damper of FIG. 8 in the second position.

Referring to FIGS. 10 and 10A, in operation the headrest 380 is positioned forward about the headrest pivot 384 by a user. The second end 350 of the wire 178, secured to a portion of the headrest pivot 384, travels circumferentially with the headrest pivot perimeter. This tensions the wire 178, unwinding it from the spool 200, as shown by the arrow 370 in FIG. 10A. This concurrent rotation of the spool 200 and of the shaft 118 activates the damping response within the rotary damper 100 through the wire 178, suppressing the speed of forward motion of the headrest 380.

Figure 11:
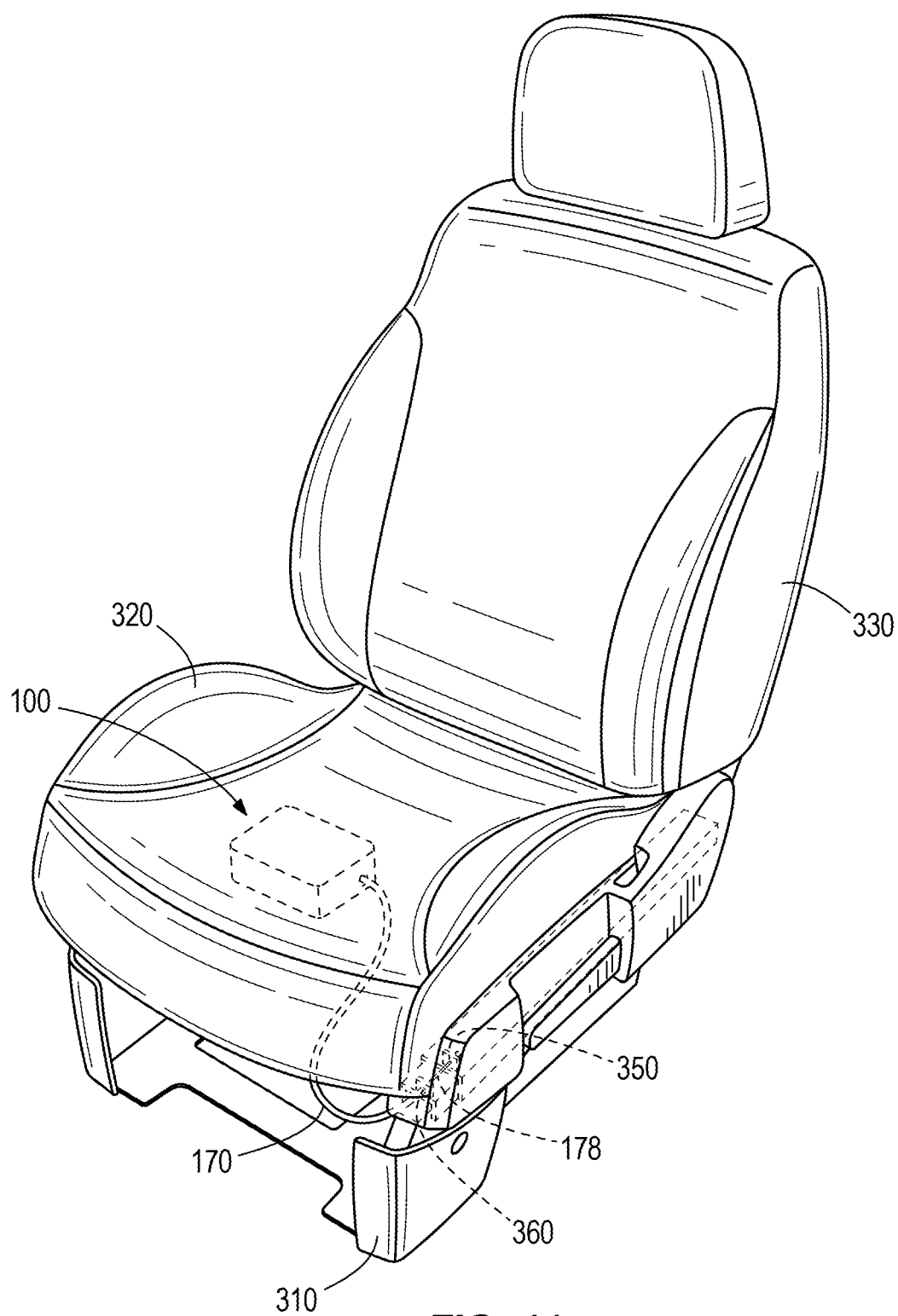
FIG. 11 is a perspective view of a vehicle seat including a remote damper for translational damping of the seat.

FIG. 11 shows another seat having a seat track 310, a seat base 320, and a seat backrest 330 and including a damper 100 positioned to damp translational motion of the seat base 320 in relation to the seat track 310 fixed to the vehicle floor. The damper 100 is secured to a fixed structural feature within the seat base 320. The second end 360 of the sheath 174 is secured to a portion of the seat base 320 while the second end 350 of the wire 178 is coupled to the fixed seat track 310. Translational motion of the seat base 320 with respect to the seat track 310 results in tension in the wire 178 and damped motion of the seat base 320 in a manner substantially similar to that previously described.

Additional movements of the seat can also be damped, to include a full frontward rollup of the seat, in which the seat back first folds forward, followed by the forward pivoting of the seat base to increase cargo area, as is commonly utilized in the rear seats of SUVs and minivans. Other rotational or translational movements of various seat components are within the contemplated applications of the invention.

Figure 12:
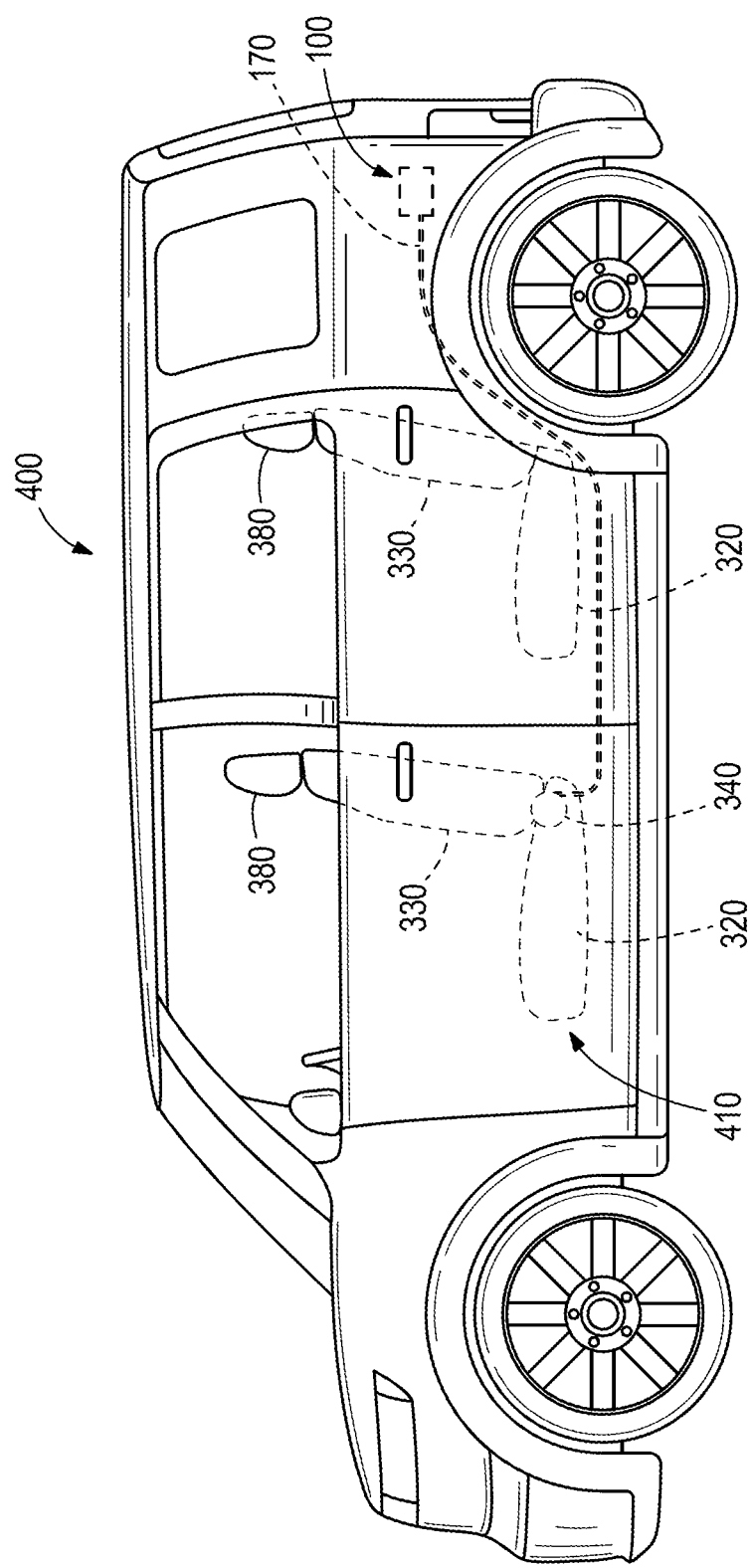
FIG. 12 is a side view of a vehicle with a remote damper located apart from the vehicle seat.

Referring to FIG. 12, the remote damper 100 need not be positioned within the seat for which motion is to be damped. As illustrated, the damper 100 may be located at a rear portion of a vehicle 400, such as in a trunk or within the cargo area. In such a position, the traction cable 170 extends from the damper 100 to the point of application, such as the seat pivot 340 of a front seat 410. Other variations are within the scope of the invention, and the second ends 360, 350 of the sheath 174 and the wire 178, respectively, could be positioned anywhere within the seat as previously described. Moreover, the positioning can be reversed such that the damper 100 is positioned within the seat and the second end 350 of the wire 178 is secured within the trunk, cargo hold, or any other remote location within the vehicle 400.

Various features and advantages of the invention are set forth in the following claims.

What is claimed is:

1. An adjustable vehicle seat comprising:
 a seat base;
 a headrest;
 a backrest;
 a pivot that couples the headrest to the backrest; and
 a remote damping system comprising
  a housing positioned in and fixed with respect to the backrest;
  a damping element disposed within the housing; and
  a traction cable having a sheath with a first end and a second end, and a wire with a first end and a second end, wherein the first end of the sheath is fixed with respect to the housing and the first end of the wire is secured to the damping element, wherein the wire extends between the first end and the second end around a portion of the pivot and the second end of the wire is secured to a fixed point in the headrest or is secured to the pivot.

2. The adjustable vehicle seat of claim 1, wherein the damping element operates linearly.

3. The adjustable vehicle seat of claim 1, wherein the damping element operates rotationally.

4. An adjustable vehicle seat comprising:
 a seat base;
 a headrest;
 a backrest;
 a pivot that couples the backrest to the seat base; and
 a remote damping system comprising
  a housing positioned in and fixed with respect to the seat base;
  a damping element disposed within the housing; and
  a traction cable having a sheath with a first end and a second end, and a wire with a first end and a second end, wherein the first end of the sheath is fixed with respect to the housing and the first end of the wire is secured to the damping element, wherein the wire extends between the first end and the second end around a portion of the pivot and the second end of the wire is secured to a fixed point in the backrest or is secured to the pivot.

5. The adjustable vehicle seat of claim 4, wherein the damping element operates linearly.

6. The adjustable vehicle seat of claim 4, wherein the damping element operates rotationally.

7. An adjustable vehicle seat comprising:
 a seat base;
 a headrest;
 a backrest;
 a pivot that couples the backrest to the seat base; and
 a remote damping system comprising
  a housing positioned in and fixed with respect to the backrest;
  a damping element disposed within the housing; and
 a traction cable having a sheath with a first end and a second end, and a wire with a first end and a second end, wherein the first end of the sheath is fixed with respect to the housing and the first end of the wire is secured to the damping element, wherein the wire extends between the first end and the second end around a portion of the pivot and the second end of the wire is secured to a fixed point in the seat base.

8. The adjustable vehicle seat of claim 7, wherein the damping element operates linearly.

9. The adjustable vehicle seat of claim 7, wherein the damping element operates rotationally.

10. An adjustable vehicle seat comprising:
 a seat base;
 a headrest;
 a backrest;
 a pivot that couples the headrest to the backrest; and
 a remote damping system comprising
  a housing positioned in and fixed with respect to the headrest;
  a damping element disposed within the housing; and
 a traction cable having a sheath with a first end and a second end, and a wire with a first end and a second end, wherein the first end of the sheath is fixed with respect to the housing and the first end of the wire is secured to the damping element, wherein the wire extends between the first end and the second end of the wire around a portion of the pivot and the second end of the wire is secured to a fixed point in the backrest.

11. The adjustable vehicle seat of claim 10, wherein the damping element operates linearly.

12. The adjustable vehicle seat of claim 10, wherein the damping element operates rotationally.

* * * * *